US010515203B2

(12) United States Patent
Luo et al.

(10) Patent No.: US 10,515,203 B2
(45) Date of Patent: Dec. 24, 2019

(54) METHOD AND SYSTEM FOR IMPROVING SECURITY OF A MOBILE TERMINAL

(71) Applicant: Conew Network Technology (Beijing) Co., Ltd., Beijing (CN)

(72) Inventors: Yafeng Luo, Beijing (CN); Min Zhao, Beijing (CN); Yong Chen, Beijing (CN)

(73) Assignee: CONEW NETWORK TECHNOLOGY (BEIJING) CO., LTD., Beijing (CN)

(*) Notice: Subject to any disclaimer, the term of this patent is extended or adjusted under 35 U.S.C. 154(b) by 318 days.

(21) Appl. No.: 15/320,415

(22) PCT Filed: Aug. 31, 2015

(86) PCT No.: PCT/CN2015/088570
§ 371 (c)(1),
(2) Date: Dec. 20, 2016

(87) PCT Pub. No.: WO2016/034090
PCT Pub. Date: Mar. 10, 2016

(65) Prior Publication Data
US 2017/0277881 A1 Sep. 28, 2017

(30) Foreign Application Priority Data

Sep. 5, 2014 (CN) .......................... 2014 1 0453791

(51) Int. Cl.
*G06F 21/36* (2013.01)
*H04W 12/06* (2009.01)
(Continued)

(52) U.S. Cl.
CPC .......... *G06F 21/36* (2013.01); *G06F 21/6281* (2013.01); *H04L 63/083* (2013.01); *H04M 1/673* (2013.01); *H04W 12/06* (2013.01)

(58) Field of Classification Search
CPC ...... G06F 21/36; G06F 21/316; H04W 12/08; H04W 12/06; H04M 1/67; H04M 1/673; H04L 63/083; H04L 9/3226
See application file for complete search history.

(56) References Cited

U.S. PATENT DOCUMENTS 8,904,479 B1 * 12/2014 Johansson ............... G06F 21/36
726/2
9,778,837 B2 * 10/2017 Shepherd .............. G06F 3/0482
(Continued)

FOREIGN PATENT DOCUMENTS

CN 101867650 A 10/2010
CN 103699830 A * 4/2014
(Continued)

Primary Examiner — Nelson S. Giddins
(74) Attorney, Agent, or Firm — Norton Rose Fulbright US LLP

(57) ABSTRACT

A method and system for improving security of a mobile terminal can be used to determine whether the obtained slide-to-unlock operation matches with prerecorded slide-to-unlock operation habits of an owner of the mobile terminal, thereby determine whether the current user is the owner, and perform corresponding processing. With this method and system, it is not required to remind a user to input verification information, such that the current user cannot perceive that verification is currently in process. Therefore, the validity of the verification can be ensured and the security of the mobile terminal can be improved effectively.

12 Claims, 3 Drawing Sheets

(51) Int. Cl.
  *H04M 1/673* (2006.01)
  *H04L 29/06* (2006.01)
  *G06F 21/62* (2013.01)

(56) References Cited

U.S. PATENT DOCUMENTS

| | | | |
|---|---|---|---|
| 2012/0214442 A1* | 8/2012 | Crawford | H04W 12/06 |
| | | | 455/411 |
| 2014/0283135 A1* | 9/2014 | Shepherd | G06F 3/0482 |
| | | | 726/29 |
| 2014/0317726 A1* | 10/2014 | Turgeman | G06F 21/32 |
| | | | 726/19 |
| 2016/0050209 A1* | 2/2016 | Govande | H04L 63/101 |
| | | | 726/7 |
| 2016/0057623 A1* | 2/2016 | Dutt | H04W 12/06 |
| | | | 455/411 |

FOREIGN PATENT DOCUMENTS

| | | |
|---|---|---|
| CN | 103699830 A | 4/2014 |
| CN | 103838494 A | 6/2014 |
| CN | 103927466 A | 7/2014 |

\* cited by examiner

METHOD AND SYSTEM FOR IMPROVING SECURITY OF A MOBILE TERMINAL

CROSS-REFERENCE TO RELATED APPLICATIONS

The present application is a national phase application under 35 U.S.C. § 371 of International Application No. PCT/CN2015/088570 filed Aug. 31, 2015, which claims priority to Chinese patent application No. 201410453791.3, entitled "Method and System for improving security of a mobile terminal" filed Sep. 5, 2014. The entire contents of each of the above-referenced applications are incorporated into the present application by reference.

TECHNICAL FIELD

The present application relates to the field of mobile terminal security technology, particularly to a method and system for improving the security of a mobile terminal.

BACKGROUND

With the development of technology, mobile phones, tablets and other mobile terminals gradually enter into people's life. For the purpose of anti-theft, some verification modes, such as a combination lock, are often used by a user to improve the security of a mobile terminal.

Existing verification modes for improving the security of a mobile terminal are active verifications, in which the mobile terminal reminds the user to perform verification via an interface for inputting verification information. The user inputs the verification information, and the user can perform various operations on the mobile terminal after the verification is passed. The active verification modes, however, need to remind a user to perform verification, and when a thief finds that a mobile phone needs to be verified, he or she will not perform the verification, which causes failure of the verification and it cannot be known whether the current user is the owner of the mobile phone, thus also incapable of performing other security processing such as alarming or the like.

SUMMARY OF THE INVENTION

The aim of embodiments of the present application is to provide a method and a system for improving security of a mobile terminal to realize the purpose of improving the security of a mobile terminal.

In order to achieve the above aim, embodiments of the present application disclose a method for improving security of a mobile terminal, which comprises:

when the mobile terminal is in a locked state, obtaining a slide-to-unlock operation of a current user;

determining whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

Optionally, the prerecorded slide-to-unlock operation habits of the owner include any one or more of: the range of a habitual starting point of the slide-to-unlock operation of the owner, the range of a habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner.

Optionally, the first security processing comprises: maintaining the locked state of the mobile terminal and performing second security processing.

Optionally, the first security processing comprises: performing unlocking processing which puts the mobile terminal in an unlocked state, and performing second security processing.

Optionally, the first security processing comprises:

displaying an interface for inputting verification information, and receiving the verification information input by the current user;

determining whether the verification information input by the current user is identical with preset verification information, if yes, performing unlocking processing, otherwise, performing the second security processing.

Optionally, it further comprises:

obtaining a screen switching operation of the current user when the mobile terminal is in an unlocked state;

determining whether the screen switching operation matches with prerecorded screen switching operation habits of the owner, if not, performing second security processing.

Optionally, the second security processing comprises any one or more of the following processing:

obtaining first information and sending it to an external device, the first information including any one or more of: a geographical location of the mobile terminal, images taken by the mobile terminal, videos filmed by the mobile terminal, audios recorded by the mobile terminal, and fingerprints collected by the mobile terminal;

locking all or part of functions of each application program in a preset application program group, such that the current user cannot use the locked functions;

restoring to factory settings;

clearing sensitive data;

sending sensitive data to an external device;

playing a preset audio;

sending a notification that the mobile terminal is stolen to an external device.

A system for improving security of a mobile terminal, which comprises: a slide-to-unlock operation obtaining unit, a slide-to-unlock habit determining unit, an unlocking unit and a first security processing unit, wherein the slide-to-unlock operation obtaining unit is used to obtain a slide-to-unlock operation of a current user when the mobile terminal is in a locked state;

the slide-to-unlock habit determining unit is used to determine whether the slide-to-unlock operation matches with prerecorded slide-to-unlock operation habits of an owner of the mobile terminal, if yes, trigger the unlocking unit, otherwise trigger the first security processing unit;

the unlocking unit is used to perform unlocking processing, which puts the mobile terminal in an unlocked state;

the first security processing unit is used to perform first security processing, which is different from the unlocking processing.

Optionally, the prerecorded slide-to-unlock operation habits of the owner include any one or more of: the range of a habitual starting point of the slide-to-unlock operation of the owner, the range of a habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner.

Optionally, the first security-processing unit comprises: a locking maintaining unit and a second security processing unit, wherein the locking maintaining unit is used to maintain the locked state of the mobile terminal;

the second security processing unit is used to perform second security processing.

Optionally, the first security processing unit comprises: the unlocking unit and a second security processing unit, wherein the second security processing unit is used to perform second security processing.

Optionally, the first security processing unit comprises: a verification information receiving unit, an information verifying unit, an unlocking unit and a second security processing unit, wherein the verification information receiving unit is used to display an interface for inputting verification information, and receiving the verification information input by the current user;

the information verifying unit is used to determine whether the verification information input by the current user is identical with preset verification information, if yes, trigger the unlocking unit, otherwise trigger the second security processing unit;

the unlocking unit is used to perform unlocking processing:

the second security processing unit is used to perform second security processing.

Optionally, it further comprises: a screen switching operation obtaining unit, a switching habit determining unit and a second security processing unit, wherein the screen switching operation obtaining unit is used to obtain a screen switching operation of the current user when the mobile terminal is in an unlocked state;

the switching habit determining unit is used to determine whether the screen switching operation matches with prerecorded screen switching operation habits of the owner of the mobile terminal, if not, trigger the second security processing unit;

the second security processing unit is used to perform second security processing.

Optionally, the second security processing unit comprises any one or more of the following modules:

an information sending module, used to obtain first information and sending it to an external device, the first information including any one or more of: a geographical location of the mobile terminal, images taken by the mobile terminal, videos filmed by the mobile terminal, audios recorded by the mobile terminal, and fingerprints collected by the mobile terminal;

a locking module, used to lock all or part of functions of each application program in a preset application program group, such that the current user cannot use the locked functions;

a restoring module, used to restore to factory settings;

a data clearing module, used to clear sensitive data;

a sensitive data sending module, used to send sensitive data to an external device;

an audio playing module, used to play a preset audio;

a notification sending module, used to send a notification that the mobile terminal is stolen to an external device.

Accordingly, embodiments of the present application further provide a storage medium, wherein the storage medium is used to store an application program for executing the method for improving security of a mobile terminal of the present application when running. Here, the method for improving security of a mobile terminal of the present application comprises:

when the mobile terminal is in a locked state, obtaining a slide-to-unlock operation of a current user;

determining whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

Accordingly, embodiments of the present application further provide an application program, wherein the application program is used for executing the method for improving security of a mobile terminal of the present application when running. Here, the method for improving security of a mobile terminal of the present application comprises:

when the mobile terminal is in a locked state, obtaining a slide-to-unlock operation of a current user;

determining whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

Accordingly, embodiments of the present application further provide a mobile terminal comprising:

a processor, a memory, communication interfaces and a communication bus;

the processor, the memory and the communication interfaces connecting to and communicating with each other via the communication bus;

the memory storing executable program code;

the processor, by reading the executable program code stored in the memory, executing the program corresponding to the executable program code, so that:

when the mobile terminal is in a locked state, obtain a slide-to-unlock operation of a current user;

determine whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

Embodiments of the present application provide a method and system for improving security of a mobile terminal, which can determine whether the obtained slide-to-unlock operation matches with a prerecorded slide-to-unlock operation habits of an owner of the mobile terminal, thereby determining whether the current user is the owner, and perform corresponding processing. The present application does not need to remind a user to input verification information, such that the current user cannot perceive that verification is currently in process, and thereby the validity of this verification can be ensured. The present application can effectively improve the security of the mobile terminal.

BRIEF DESCRIPTION OF THE DRAWINGS

In order to explain the technical solutions of embodiments of the present application or of the prior art, a simple introduction of the drawings required in the description of the embodiments and of prior art will be given. Obviously, the drawings described below are just some embodiments of the present application and other drawings may be obtained by those of ordinary skill in the art without any creative effort based on these drawings.

DETAILED DESCRIPTION OF THE INVENTION

Next, clear and complete description of the technical solution of the present application will be given in combination of drawings of the present application. Obviously, the embodiments described is merely parts of the embodiments of the present application, instead of all the embodiments. Depending on the embodiments of the present application, all other embodiments obtained by those of ordinary skilled in the art without any creative efforts belong to the protection scope of the present application.

Figure 1:
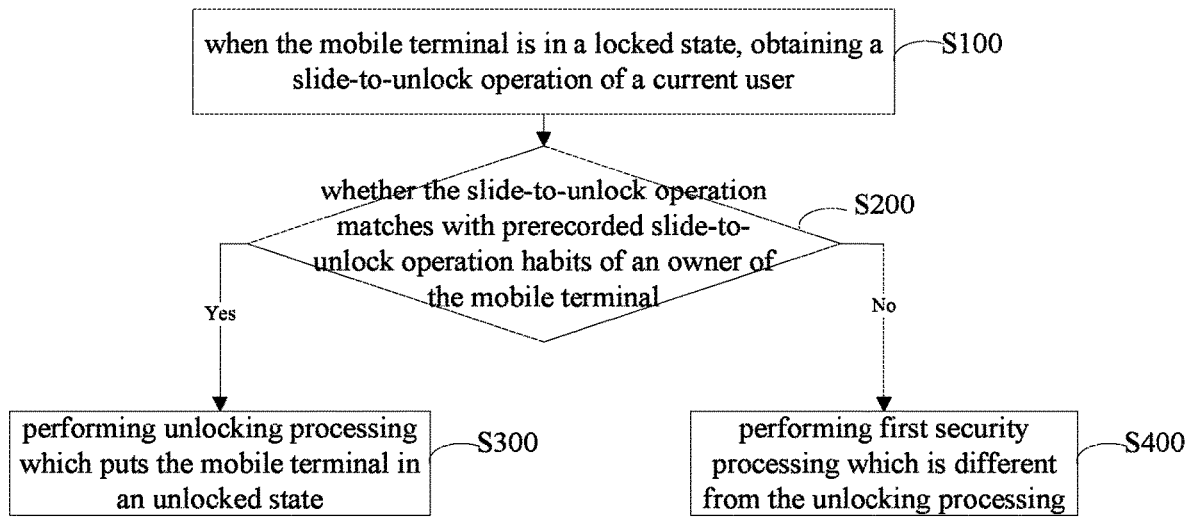
FIG. 1 is a flow chart of a method for improving security of a mobile terminal provided by embodiments of the present application.

As shown in FIG. 1, a method for improving security of a mobile terminal provided by embodiments of the present application may comprise:

S100, when the mobile terminal is in a locked state, obtaining a slide-to-unlock operation of a current user;

Specifically, since there are various slide-to-unlock manners, there are various different slide-to-unlock operation forms, for example: sliding from left to right, sliding from the bottom up etc. The slide-to-unlock operation obtained in S100 may be the starting point, the ending point, the track, the speed, the length, the direction and the like of the slide-to-unlock operation.

S200, determining whether the slide-to-unlock operation matches with prerecorded slide-to-unlock operation habits of an owner of the mobile terminal, if yes, performing S300, otherwise performing S400;

Here, the prerecorded slide-to-unlock operation habits of the owner may include any one or more of: the range of a habitual starting point of the slide-to-unlock operation of the owner, the range of a habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner. Optionally, the slide-to-unlock operation habits of the owner can be collected beforehand, which requires the owner to perform slide-to-unlock operations for a plurality of times so as to record the slide-to-unlock operations and determine the slide-to-unlock operation habits of the owner according to the slide-to-unlock operations of the owner. For example: the owner inputs slide-to-unlock operations for ten times, whose lengths respectively are: 3.0 cm, 2.8 cm, 4.1 cm, 2.7 cm, 5.7 cm, 3.6 cm, 3.1 cm, 3.8 cm, 3.7 cm, 4.2 cm. Since 5.7 cm is the longest and has a huge difference with the second longest length 4.2 cm, 5.7 cm can be abandoned, and the range of the habitual length of the slide-to-unlock operation of the owner is from 2.7 cm to 4.2 cm. Of course, the owner can modify the prerecorded slide-to-unlock operation habits of the owner to improve the accuracy of verification.

It can be understood that, due to the differences of the hand size, the finger length, the agility and personal habits, the slide-to-unlock operation habits are different when the slide-to-unlock operations is performed by different people. Therefore, whether the current user is the owner can be determined according to the prerecorded slide-to-unlock operation habits of the owner and subsequent security processing can be performed.

There are various specific ways to determine whether the slide-to-unlock operation matches with prerecorded slide-to-unlock operation habits of an owner, such as: determining all or part of parameters of the prerecorded slide-to-unlock operation habits of the owner. The prerecorded slide-to-unlock operation habits are assumed to include: the range of a habitual starting point of the slide-to-unlock operation of the owner, the range of an habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner. In this case, it is possible to only determine whether the slide-to-unlock operation of the current user matches with the habitual track of the slide-to-unlock operation of the owner, and execute S300 when it does, otherwise, execute S400. Of course, it is also possible to only determine whether the slide-to-unlock operation of the current user matches with the range of the habitual starting point of the slide-to-unlock operation of the owner and the habitual track of the slide-to-unlock operation of the owner, and execute S300 when it matches with both, otherwise execute S400. Of course, it is also possible to determine whether the slide-to-unlock operation of the current user matches with the range of the habitual starting point of the slide-to-unlock operation of the owner, the range of the habitual ending point of the slide-to-unlock operation of the owner, the range of the habitual length of the slide-to-unlock operation of the owner, the habitual direction of the slide-to-unlock operation of the owner, the habitual speed of the slide-to-unlock operation of the owner and the habitual track of the slide-to-unlock operation of the owner, and execute S300 when it matches with all of these, otherwise, execute S400.

S300, performing unlocking processing which puts the mobile terminal in an unlocked state;

S400, performing first security processing which is different from the unlocking processing.

Here, the first security processing may be: maintaining the locked state of the mobile terminal, and performing second security processing.

Thus, when the slide-to-unlock operation of the current user does not match with the slide-to-unlock operation habits of the owner, the slide-to-unlock operation of this user cannot slide to unlock the mobile terminal, so that the current user cannot use the mobile terminal, and thus the security of the mobile terminal is ensured effectively.

It can be understood that, when the current user perceives that he/she is found not to be the owner by the mobile terminal, the current user will perform some operations (such as shutting down the mobile terminal or pulling out the buttery) to prevent possible security processing such as alarming and the like made by the mobile terminal. Therefore, in other embodiments of the present application, the first security processing may also be: performing unlocking processing which puts the mobile terminal in an unlocked state and performing second security processing.

In this case, the mobile terminal still executes the unlocking processing, such that the current user cannot perceive that he/she has been found not to be the owner. In this way, the mobile terminal can perform security processing without being interrupted by the current user.

Of course, in other embodiments of the present application, the first security processing in S400 may include:

displaying an interface for inputting verification information, and receiving the verification information input by a current user;

determining whether the verification information input by the current user is identical with preset verification information, if yes, performing unlocking processing, otherwise performing second security processing.

In some cases, the slide-to-unlock operation of the owner may not match with his/her own operation habit. In this case, in order to prevent an incorrect operation, the user can be reminded to perform verification in other ways such as password etc.

Optionally, the above-mentioned second security processing in the embodiments of the present application may comprise any one or more of the following seven processing:

the first processing, obtaining first information and sending it to an external device. The first information includes any one or more of: a geographical location of the mobile terminal, images taken by the mobile terminal, videos filmed by the mobile terminal, audios recorded by the mobile terminal, and fingerprints collected by the mobile terminal;

the second processing, locking all or part of functions of each application program in a preset application program group, such that the current user cannot use the locked functions;

the third processing, restoring to factory settings;

the forth processing, clearing sensitive data;

the fifth processing, sending sensitive data to an external device;

the sixth processing, playing a preset audio;

the seventh processing, sending a notification that the mobile terminal is stolen to an external device.

In the above-mentioned first processing, the images taken by the mobile terminal, the videos filmed by the mobile terminal, the audios recorded by the mobile terminal and the fingerprints collected by the mobile terminal can be those obtained after the current user's information is collected, for example, the head image of the current user collected by a front-facing camera. In the first processing, information of the current user and/or the geographic location of the mobile terminal can be sent to an external device, thus providing important information for the owner of the mobile terminal to take back the mobile terminal. Wherein, the external device to which the first information is sent can be preset, for example, as the device providing security service by the manufacturer of the mobile terminal or a friend's mobile device etc.

In the above-mentioned second processing, functions of application programs in the mobile terminal can be locked, and thus the use of the mobile terminal by the current user can be restrained. The owner of the mobile terminal can put a sensitive application program into a preset application program group beforehand, and the sensitive application program may be an application program containing the owner's personal information or the information of the contacts of the owner, such as messages, contact list, instant messaging software etc. Of course, for some applications, it is possible to lock only part of their functions. For example, a camera application program has the functions of photographing, video-filming and photo/video viewing, and in the present application, it is possible to only lock the function of photo/video viewing and not to lock the functions of photographing and video-filming. In this way, photographing and video-filming can be executed by the camera application program.

Since there may be a large amount of sensitive information (such as account passwords), sensitive files, important application programs installed by a user, the above-mentioned third processing can be performed after the mobile terminal is stolen, i.e. restoring to factory settings. In this way, the sensitive information, sensitive files, important application programs installed by the user can all be cleared. Of course, the forth processing of clearing only the sensitive information can also be performed. In other embodiments of the present application, the fifth processing of sending the sensitive data to an external device can also be performed. In this way, the owner will not lose sensitive information because the mobile terminal is stolen.

After the mobile terminal is stolen, the sixth processing of playing an alarming audio to alarm surrounding people and to stop the behavior of the current user can be performed.

In the seventh processing, the notification that the mobile terminal is stolen can be sent to an external device to alert related persons.

Optionally, in embodiments of the present application, the mobile terminal can be recognized by other devices through International Mobile Equipment Identity (IMEI) of said mobile terminal so as to communicate with the mobile terminal.

A person, who is not the owner, may perform the processing of refurbishment, changing phone number etc, after obtaining the mobile terminal. However, the IMEI is unique, invariable for each mobile terminal, Therefore, the communication with the mobile terminal can be remained according to the IMEI.

The method for improving security of a mobile terminal provided by embodiments of the present application can be used to determine whether the obtained slide-to-unlock operation matches with prerecorded slide-to-unlock operation habits of an owner, thereby determine whether the current user is the owner, and perform corresponding processing. In the present application, it is not required to remind a user to input verification information, such that the current user cannot perceive that verification is currently in process, and thereby the validity of the verification can be ensured. With the present application, the security of the mobile terminal can be improved effectively.

Figure 2:
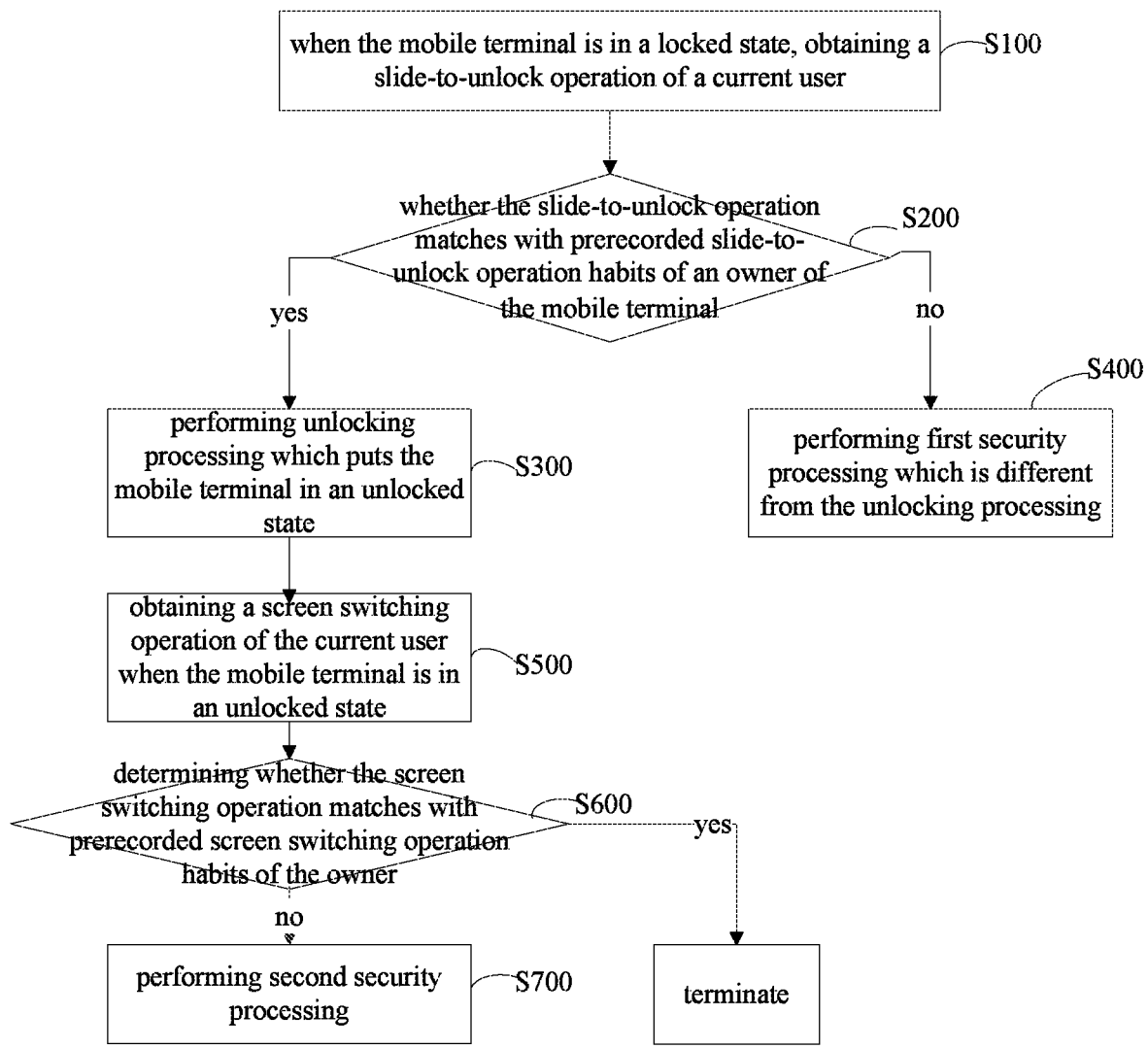
FIG. 2 is a flow chart of another method for improving security of a mobile terminal provided by embodiments of the present application.

As shown in FIG. 2, another method for improving security of a mobile terminal provided by embodiments of the present application may further include:

S500, obtaining a screen switching operation of the current user when the mobile terminal is in an unlocked state;

S600, determining whether the screen switching operation matches with prerecorded screen switching operation habits of the owner, if not, performing S700; if yes, terminating the processing.

In other embodiments of the present application, when the screen switching operation matches with the screen switching operation habits of the owner, it is also possible to perform the screen switching operation.

S700, performing second security processing.

The second security processing performed in S700 has been described in the previous embodiments, which will not be described here repeatedly.

In the embodiment shown in FIG. 2, S500 is performed after S300, while in other embodiments of the present application, S500 may also be performed after S400. When the current user is not the owner, the slide-to-unlock operation of the current user may also match with prerecorded slide-to-unlock operation habits of the owner. In order to further improve the security of the mobile terminal, it is also possible to verify a user's screen switching operation in the embodiment shown in FIG. 2. Thus, verification can be performed without being perceived by the current user, and the security of a mobile terminal is further improved.

Corresponding to the method, the present application further provides a system for improving security of a mobile terminal.

Figure 3:
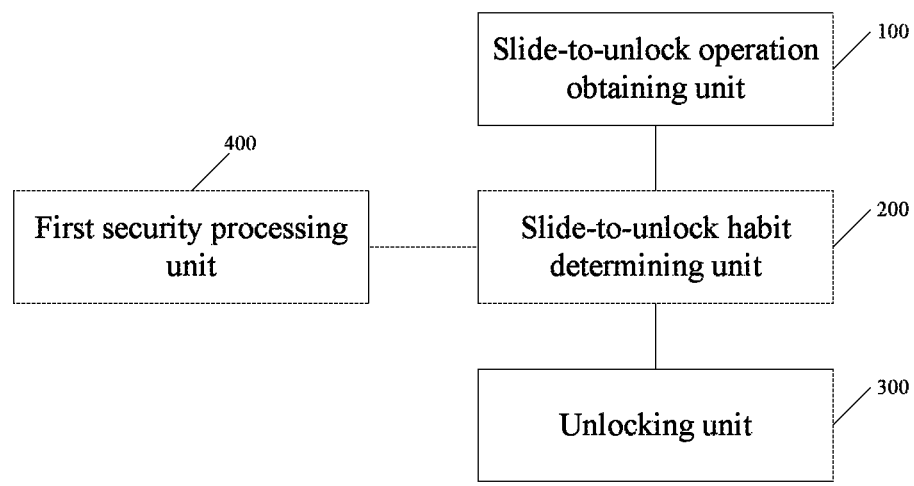
FIG. 3 is a schematic structural view of a system for improving security of a mobile terminal provided by embodiments of the present application.

As shown in FIG. 3, the system for improving security of a mobile terminal provided by embodiments of the present application may comprise: a slide-to-unlock operation obtaining unit 100, a slide-to-unlock habit determining unit 200, an unlocking unit 300 and a first security processing unit 400, wherein the slide-to-unlock operation obtaining unit 100 is used to obtain a slide-to-unlock operation of a current user when the mobile terminal is in a locked state;

the slide-to-unlock operation obtained by the slide-to-unlock operation obtaining unit 100 may be the starting point, the ending point, the track, the speed, the length, the direction and the like of the slide-to-unlock operation.

The slide-to-unlock habit determining unit 200 is used to determine whether the slide-to-unlock matches with prerecorded slide-to-unlock operation habits of an owner of the mobile terminal, if yes, trigger the unlocking unit 300, otherwise trigger the first security processing unit 400;

wherein, the prerecorded slide-to-unlock operation habits of the owner may include any one or more of: the range of a habitual starting point of the slide-to-unlock operation of the owner, the range of an habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner. Optionally, the slide-to-unlock operation habits of the owner can be collected beforehand, which requires the owner to perform slide-to-unlock operations for a plurality of times so as to record the slide-to-unlock operations and determine the slide-to-unlock operation habits of the owner according to the slide-to-unlock operations of the owner.

It can be understood that, due to the differences of the hand size, the finger length, the agility and personal habits, the slide-to-unlock operation habits are different when the slide-to-unlock operations is performed by different people. Therefore, whether the current user is the owner can be determined according to the prerecorded slide-to-unlock operation habits of the owner and subsequent security processing can be performed.

There are various specific ways to determine whether the slide-to-unlock operation matches with prerecorded slide-to-unlock operation habits of an owner, such as: determining all or part of parameters of the prerecorded slide-to-unlock operation habits of the owner. The prerecorded slide-to-unlock operation habits are assumed to include: the range of a habitual starting point of the slide-to-unlock operation of the owner, the range of an habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner. In this case, it is possible to only determine whether the slide-to-unlock operation of the current user matches with the habitual track of the slide-to-unlock operation of the owner, and trigger the unlocking unit 300 when it is, otherwise, trigger the first security processing unit 400. Of course, it is also possible to only determine whether the slide-to-unlock operation of the current user matches with the range of the habitual starting point of the slide-to-unlock operation of the owner and the habitual track of the slide-to-unlock operation of the owner, and trigger the unlocking unit 300 when it matches with both, otherwise trigger the first security processing unit 400. Of course, it is also possible to determine whether the slide-to-unlock operation of the current user matches with the range of the habitual starting point of the slide-to-unlock operation of the owner, the range of the habitual ending point of the slide-to-unlock operation of the owner, the range of the habitual length of the slide-to-unlock operation of the owner, the habitual direction of the slide-to-unlock operation of the owner, the habitual speed of the slide-to-unlock operation of the owner and the habitual track of the slide-to-unlock operation of the owner, and trigger the unlocking unit 300 when it matches with all of these, otherwise, trigger the first security processing unit 400.

The unlocking unit 300 is used to perform unlocking processing, which puts the mobile terminal in an unlocked state;

the first security processing unit 400 is used to perform the first security processing, which is different from the unlocking processing.

Optionally, the first security processing unit 400 may comprise: a locking maintaining unit and a second security processing unit, wherein the locking maintaining unit is used to maintain the locked state of the mobile terminal;

the second security processing unit is used to perform second security processing.

Thus, when the slide-to-unlock operation of the current user does not match with the slide-to-unlock operation habits of the owner, the slide-to-unlock operation of this user cannot slide to unlock the mobile terminal, so that the current user cannot use the mobile terminal, and thus the security of the mobile terminal is ensured effectively.

It can be understood that, when the current user perceives that he/she is found not to be the owner by the mobile terminal, the current user will perform some operations (such as shutting down the mobile terminal or pulling out the buttery) to prevent possible security processing such as alarming and the like made by the mobile terminal. Therefore, in other embodiment of the present application, the first security processing unit may comprise: the unlocking unit 300 and a second security processing unit, wherein the second security processing unit is used to perform second security processing.

In this case, the mobile terminal still executes the unlocking processing, such that the current user cannot perceive that he/she has been found not to be the owner. In this way, the mobile terminal can execute security processing without being interrupted by the current user.

In other embodiment of the present application, the first security processing unit 400 may comprise: a verification information receiving unit, an information verifying unit, an unlocking unit and a second security processing unit, wherein the verification information receiving unit is used to display an interface for inputting verification information, and receiving the verification information input by the current user;

the information verifying unit is used to determine whether the verification information input by the current user is identical with preset verification information, if yes, trigger the unlocking unit, otherwise trigger the second security processing unit;

the unlocking unit is used to perform unlocking processing;

the second security processing unit is used to perform second security processing.

In some cases, the slide-to-unlock operation of the owner may not match with his/her own operation habit. In this case, in order to prevent an incorrect operation, the user can be reminded to perform verification in other ways such as password etc.

Optionally, the second security processing may comprise any one or more of the following modules:

an information sending module, used to obtain first information and sending it to an external device, the first information including any one or more of: a geographical location of the mobile terminal, images taken by the mobile terminal, videos filmed by the mobile terminal, audios recorded by the mobile terminal, and fingerprints collected by the mobile terminal;

a locking module, used to lock all or part of functions of each application program in a preset application program group, such that the current user cannot use the locked functions;

a restoring module, used to restore to factory settings;

a data clearing module, used to clear sensitive data;

a sensitive data sending module, used to send sensitive data to an external device;

an audio playing module, used to play a preset audio;

a notification sending module, used to send a notification that the mobile terminal is stolen to an external device.

The system for improving security of a mobile terminal provided by embodiments of the present application can be used to determine whether the obtained slide-to-unlock operation matches with prerecorded slide-to-unlock operation habits of an owner, thereby determine whether the current user is the owner, and perform corresponding processing. In the present application, it is not required to remind a user to input verification information, such that the current user cannot perceive that verification is currently in process, and thereby the validity of the verification can be ensured. With the present application, the security of the mobile terminal can be improved effectively.

Another system for improving security of a mobile terminal provided by embodiments of the present application may also comprise: a screen switching operation obtaining unit, a switching habit determining unit and a second security processing unit, wherein the screen switching operation obtaining unit is used to obtain a screen switching operation of the current user when the mobile terminal is in an unlocked state;

the switching habit determining unit is used to determine whether the screen switching operation matches with prerecorded screen switching operation habits of the owner of the mobile terminal, if not, trigger the second security processing unit;

the second security processing unit is used to perform second security processing.

The second security processing unit has been described in above mentioned embodiments, which will not be described here repeatedly.

When the current user is not the owner, the slide-to-unlock operation of the current user may also match with prerecorded slide-to-unlock operation habits of the owner. In order to further improve the security of the mobile terminal, it is also possible to verify a user's screen switching operation in this embodiment. Thus, verification can be performed without being perceived by the current user, and the security of a mobile terminal is further improved.

Embodiments of the present application further provide a storage medium, wherein the storage medium is used to store an application program for executing the method for improving security of a mobile terminal of the present application when running. Here, the method for improving security of a mobile terminal of the present application may comprise:

when the mobile terminal is in a locked state, obtaining a slide-to-unlock operation of a current user;

determining whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

Embodiments of the present application further provide an application program, wherein the application program is used for executing the method for improving security of a mobile terminal of the present application when running. Here, the method for improving security of a mobile terminal of the present application may comprise:

when the mobile terminal is in a locked state, obtaining a slide-to-unlock operation of a current user;

determining whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

Embodiments of the present application further provide a mobile terminal comprising:

a processor, a memory, communication interfaces and a bus;

the processor, the memory and the communication interface connecting to and communicating with each other via the communication bus;

the memory storing executable program code;

the processor, by reading the executable program code stored in the memory, executing the program corresponding to the executable program code, so that:

when the mobile terminal is in a locked state, obtain a slide-to-unlock operation of a current user;

determine whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by sentences "comprise(s) a . . . " do not exclude that there are other identical elements in the processes, methods, objects, or devices which comprise these elements.

Various embodiments of the description adopt corresponding ways to describe, and same or similar parts in various embodiments can be referred to one another, the part emphasized are all differences to other embodiments. Especially for embodiments of a system, since they are similar to embodiments of a method, the description thereof is relatively simple, the relating parts could refer to the part of the description of embodiments of the method.

Embodiments described above are just preferred embodiments of the present invention, and not indented to limit the scope of the present invention. Any modifications, equivalent, improvements or the like within the spirit and principle of the present invention are should be included in the scope of the present invention.

The invention claimed is:

1. A method for improving security of a mobile terminal, characterized in that, it comprises:
   when the mobile terminal is in a locked state, obtaining a slide-to-unlock operation of a current user;
   determining whether the slide-to-unlock operation matches with prerecorded slide-to-unlock operation habits of an owner of the mobile terminal, if yes, performing unlocking processing which puts the mobile terminal in an unlocked state; otherwise, performing first security processing which is different from the unlocking processing;
   wherein the slide-to-unlock operation matching with prerecorded slide-to-unlock operation habits of the owner of the mobile terminal means that the slide-to-unlock operation of the current user and a manner in which the slide-to-unlock operation is performed both conform to the prerecorded slide-to-unlock operation habits of the owner;
   wherein the first security processing comprises: performing unlocking processing which puts the mobile terminal in an unlocked state and performing second security processing; and
   wherein the second security processing comprises obtaining first information and sending it to an external device, the first information including any one or more of: images taken by the mobile terminal, videos filmed by the mobile terminal, audios recorded by the mobile terminal, and fingerprints collected by the mobile terminal.

2. The method according to claim 1, characterized in that, the prerecorded slide-to-unlock operation habits of the owner include any one or more of: the range of a habitual starting point of the slide-to-unlock operation of the owner, the range of a habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner.

3. The method according to claim 1, characterized in that the first security processing comprises: maintaining the locked state of the mobile terminal and performing second security processing.

4. The method according to claim 1, characterized in that, the first security processing comprises:
   displaying an interface for inputting verification information, and receiving the verification information input by the current user;
   determining whether the verification information input by the current user is identical with preset verification information, if yes, performing unlocking processing, otherwise, performing second security processing.

5. The method according to claim 1, characterized in that, it further comprises:
   obtaining a screen switching operation of the current user when the mobile terminal is in an unlocked state;
   determining whether the screen switching operation matches with prerecorded screen switching operation habits of the owner, if not, performing second security processing.

6. The method according to claim 3, characterized in that,
   the first information further comprises a geographical location of the mobile terminal; and
   the second security processing further comprises any one or more of the following processing:
      locking all or part of functions of each application program in a preset application program group, such that the current user cannot use the locked functions;
      restoring to factory settings;
      clearing sensitive data;
      sending sensitive data to an external device;
      playing a preset audio;
      sending a notification that the mobile terminal is stolen to an external device.

7. A mobile terminal, characterized in that, the mobile terminal comprises:
   a processor, a memory, communication interfaces and a bus;
   the processor, the memory and the communication interface connecting to and communicating with each other via the bus;
   the memory storing executable program code;
   the processor, by reading the executable program code stored in the memory, executing the program corresponding to the executable program code, so as to perform the steps of:
      obtaining a slide-to-unlock operation of a current user when the mobile terminal is in a locked state;
      determining whether the slide-to-unlock operation matches with prerecorded slide-to-unlock operation habits of an owner of the mobile terminal, if yes, performing unlocking processing which puts the mobile terminal in an unlocked state; otherwise, performing first security processing, which is different from the unlocking processing;
      wherein the slide-to-unlock operation matching with prerecorded slide-to-unlock operation habits of the owner of the mobile terminal means that the slide-to-unlock operation of the current user and a manner in which the slide-to-unlock operation is performed both conform to the prerecorded slide-to-unlock operation habits of the owner;
      wherein the first security processing comprises: performing unlocking processing which puts the mobile terminal in an unlocked state and performing second security processing; and
      wherein the second security processing comprises obtaining first information and sending it to an external device, the first information including any one or more of: images taken by the mobile terminal, videos filmed by the mobile terminal, audios recorded by the mobile terminal, and fingerprints collected by the mobile terminal.

8. The mobile terminal according to claim 7, characterized in that, the prerecorded slide-to-unlock operation habits of the owner include any one or more of: the range of a habitual starting point of the slide-to-unlock operation of the owner, the range of a habitual ending point of the slide-to-unlock operation of the owner, the range of the habitual length of the slide-to-unlock operation of the owner, a habitual direction of the slide-to-unlock operation of the owner, a habitual speed of the slide-to-unlock operation of the owner, and a habitual track of the slide-to-unlock operation of the owner.

9. The mobile terminal according to claim 7, characterized in that, the first security processing comprises:
   maintaining the locked state of the mobile terminal; and
   performing second security processing.

10. The mobile terminal according to claim 7, characterized in that, the first security processing comprises:
   displaying an interface for inputting verification information, and receiving the verification information input by the current user;
   determining whether the verification information input by the current user is identical with preset verification information, if yes,
   performing unlocking processing; otherwise,
   performing second security processing.

11. The mobile terminal according to claim 7, characterized in that the processor further performs the step of obtaining a screen switching operation of the current user when the mobile terminal is in an unlocked state;
   determining whether the screen switching operation matches with prerecorded screen switching operation habits of the owner of the mobile terminal, if not,
   performing second security processing.

12. The mobile terminal according to claim 9, characterized in that,
   the first information comprises a geographical location of the mobile terminal, and
   the second security processing further comprises any one or more of the following processing:
      locking all or part of functions of each application program in a preset application program group, such that the current user cannot use the locked functions;
      restoring to factory settings;
      clearing sensitive data;
      sending sensitive data to an external device;
      playing a preset audio;
   sending a notification that the mobile terminal is stolen to an external device.

\* \* \* \* \*